US009819536B2

(12) United States Patent
Tsubota

(10) Patent No.: US 9,819,536 B2
(45) Date of Patent: Nov. 14, 2017

(54) RELAY SYSTEM AND SWITCHING DEVICE

(71) Applicant: Hitachi Metals, Ltd., Minato-ku, Tokyo (JP)

(72) Inventor: Shigeru Tsubota, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 134 days.

(21) Appl. No.: 14/931,197

(22) Filed: Nov. 3, 2015

(65) Prior Publication Data

US 2016/0191302 A1 Jun. 30, 2016

(30) Foreign Application Priority Data

Dec. 24, 2014 (JP) ................................ 2014-260530

(51) Int. Cl.
*H04L 12/24* (2006.01)
*H04B 7/14* (2006.01)
*H04B 3/36* (2006.01)

(52) U.S. Cl.
CPC ........... *H04L 41/0654* (2013.01); *H04B 3/36* (2013.01); *H04B 7/14* (2013.01)

(58) Field of Classification Search
CPC ..... H04L 12/437; H04L 12/42; H04L 12/462; H04L 12/4637; H04L 12/4641; H04L 45/28; H04L 45/00; H04L 45/48; H04L 45/22; H04L 45/745; H04L 45/18; H04L 45/586; H04L 49/351; H04L 49/604; H04L 49/552; H04L 69/40; H04L 41/0654; H04L 2012/6437; H04B 10/03; H04B 10/032; H04B 7/14; H04B 3/36
See application file for complete search history.

(56) References Cited

U.S. PATENT DOCUMENTS

| | | | | |
|---|---|---|---|---|
| 2013/0039222 A1* | 2/2013 | Huang | .................... | H04L 12/42 370/258 |
| 2013/0064069 A1* | 3/2013 | Huang | .................. | H04L 12/437 370/222 |
| 2013/0242722 A1* | 9/2013 | Meki | .................... | H04L 41/0659 370/225 |
| 2013/0258840 A1* | 10/2013 | Holness | .................. | H04L 49/00 370/222 |
| 2015/0200723 A1* | 7/2015 | Tochio | .................. | H04B 10/032 398/4 |
| 2016/0142225 A1* | 5/2016 | Taniguchi | ............. | H04L 12/437 370/223 |

OTHER PUBLICATIONS

Recommendation ITU-T G. 8032/Y. 1344, "Ethernet ring protection switching", International Telecommunication Union, Feb. 2012 (One hundred four (104) pages).

* cited by examiner

*Primary Examiner* — Yemane Mesfin
*Assistant Examiner* — Peter Chen
(74) *Attorney, Agent, or Firm* — Crowell & Moring LLP

(57) ABSTRACT

When transmitting an R-APS (NR) frame, a control frame processing unit sets a priority setting value arbitrarily set by a user as a value of a node ID region. A ring control unit compares priority based on a value of the node ID region of the R-APS (NR) frame transmitted from its own device and a value of the node ID region of the R-APS (NR) frame transmitted from a different device, and the ring control unit determines whether a ring port is maintained in a block state or changed from the block state to an open state based on a result of the comparison.

18 Claims, 12 Drawing Sheets

FDB: ADDRESS TABLE

| MAC ADDRESS | VID | PORT ID |
|---|---|---|
| MAa | 1 | {Pu[1]} |
| MAb | 1 | {Pr[2]} |
| MAc | 1 | {Pr[2]} |
| MAd | 1 | {Pr[2]} |
| ... | ... | ... |

RELAY SYSTEM AND SWITCHING DEVICE

CROSS-REFERENCE TO RELATED APPLICATION

The present application claims priority from Japanese Patent Application No. 2014-260530 filed on Dec. 24, 2014, the content of which is hereby incorporated by reference into this application.

TECHNICAL FIELD OF THE INVENTION

The present invention relates to a relay system and a switching device, for example, a relay system and a switching device which use a ring protocol specified by ITU-T (International Telecommunication Union Telecommunication Standardization Sector) G.8032.

BACKGROUND OF THE INVENTION

For example, ITU-T G.8032/Y.1344 (February 2012) (Non-Patent Document 1) describes process contents at the time of recovery from fault in the ring network based on the ITU-T G.8032. Specifically, one of two ring ports controlled to a block state with a fault link interposed therebetween is controlled to an open state based on the priority of two nodes having the two ring ports.

SUMMARY OF THE INVENTION

As one of ring protocols, for example, the ring protocol specified by ITU-T G.8032 has been known as described in the Non-Patent Document 1. This ring protocol is referred to as ERP (Ethernet (registered trademark) Ring Protocol) in some cases. In this ring protocol, as described above, at the time of recovery from fault, one of the ring ports controlled to a block state is controlled to an open state based on the priority of the two nodes.

Specifically, at the time of recovery from fault, the two nodes both transmit an R-APS (NR) frame (short for Ring-Automatic Protection Switching (No Request) frame) functioning as a fault recovery notification frame. The R-APS (NR) frame contains a node ID of the node itself. The node ID is composed of a 48-bit region, and a MAC (Media Access Control) address is usually set as the node ID. One of the two nodes receives the R-APS (NR) frame from the other node and compares the node ID of the frame with the node ID of the node itself to determine whether the ring port of the node itself is maintained in the block state or changed to the open state based on the comparison result. However, since the MAC address is usually set fixedly by a device vendor or the like, it is difficult for a user to arbitrarily determine the ring port to be opened at the time of recovery from fault.

The present invention has been made in view of such a circumstance, and one object thereof is to provide a relay system and a switching device capable of arbitrarily determining the ring port to be opened at the time of recovery from fault.

The above and other objects and novel characteristics of the present invention will be apparent from the description of the present specification and the accompanying drawings.

The following is a brief description of an outline of a typical embodiment of the invention disclosed in the present application.

A relay system according to an embodiment is provided with a plurality of switching devices constituting a ring network. At least one of the plurality of switching devices includes: a ring port connected to the ring network; a holding unit which holds a priority setting value arbitrarily set by a user; a control frame processing unit; and a ring control unit. The control frame processing unit transmits a first fault recovery notification frame from the ring port and receives a second fault recovery notification frame from a different switching device at the ring port when a recovery from fault of the ring port in a block state is detected. The ring control unit controls the ring network. Here, the control frame processing unit sets the priority setting value as a value of a predetermined region of the first fault recovery notification frame when transmitting the first fault recovery notification frame. The ring control unit compares priority based on the value of the predetermined region of the first fault recovery notification frame and a value of the predetermined region of the second fault recovery notification frame and determines whether the ring port is maintained in the block state or changed from the block state to an open state based on a result of the comparison.

The effects obtained by the typical embodiment of the invention disclosed in the present application will be briefly described below. That is, it is possible to arbitrarily determine the ring port to be opened at the time of recovery from fault in a relay system and a switching device using, for example, the ring protocol specified by ITU-T G.8032.

BRIEF DESCRIPTIONS OF THE DRAWINGS

DESCRIPTIONS OF THE PREFERRED EMBODIMENTS

Figure 1:
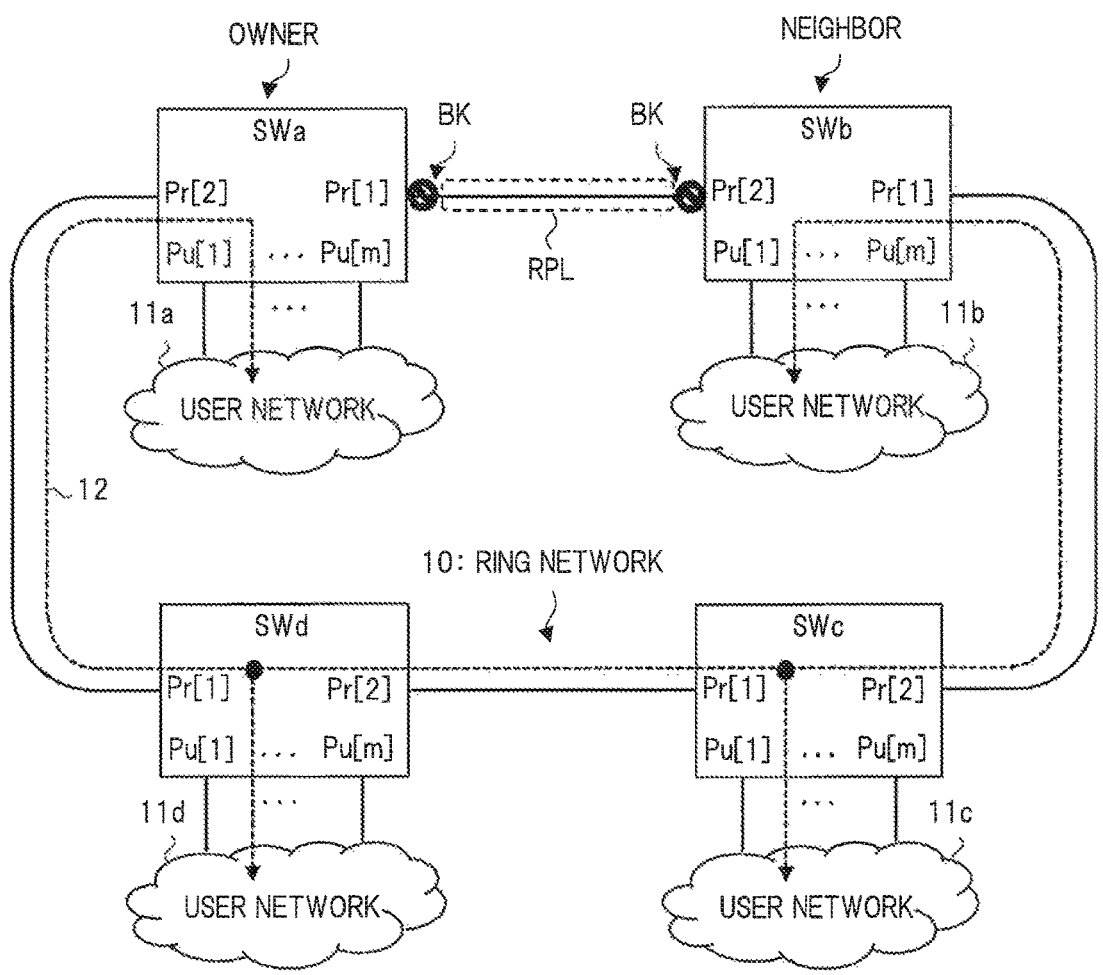
FIG. 1 is a schematic diagram showing a configuration example and an operation example in the absence of fault to be a premise of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

General Configuration and General Operation in Absence of Fault of Relay System (Premise)

FIG. 1 is a schematic diagram showing a configuration example and an operation example in the absence of fault to be a premise of a relay system according to the first embodiment of the present invention. The relay system shown in FIG. 1 includes a plurality of (here, four) switching devices SWa to SWd constituting a ring network 10. Each of the switching devices SWa to SWd is referred to also as a node. Each of the switching devices SWa to SWd has two ring ports Pr[1] and Pr[2] and m (m is an integer of 1 or more) user ports Pu [1] to Pu[m]. Although the number of switching devices constituting the ring network 10 is assumed to be 4 in this example, the number is not limited to this, and may be 2 or more.

The ring network 10 is controlled based on, for example, a ring protocol specified by ITU-T G.8032. In other words, each of the switching devices SWa to SWd is provided with various control functions based on the ring protocol. Each of the switching devices SWa to SWd is an L2 switch which performs relay process of a layer 2 (L2) of an OSI reference model or may be an L3 switch which performs relay process of a layer 3 (L3). However, since the relay process on the ring network 10 is performed based on the L2, the case where each of the switching devices SWa to SWd is the L2 switch is taken as an example here.

The two ring ports Pr[1] and Pr[2] are each connected to the ring network 10. In other words, each of the switching devices SWa to SWd is connected via the ring ports Pr[1] and Pr[2] in a ring shape, so that the ring network 10 is formed. In the example of FIG. 1, the ring ports Pr[1] of the switching devices SWa, SWb, SWc and SWd are connected to the ring ports Pr[2] of the neighboring switching devices SWb, SWc, SWd and SWa through a communication line, respectively.

The user ports Pu[1] to Pu[m] are connected to predetermined user networks. In the example of FIG. 1, the user ports Pu[1] to Pu[m] of the switching devices SWa to SWd are connected to user networks 11a to 11d, respectively. In each of the user networks 11a to 11d, switching devices, various information processing devices (server device, terminal device and others) and others are arranged appropriately.

Here, based on ITU-T G.8032, the switching device SWa is set as an owner node, and the switching device SWb is set as a neighbor node. A link between the owner node and the neighbor node is referred to as RPL (Ring Protection Link). When there is no fault on the ring network 10, the switching device SWa sets the ring port Pr[1] located at one end of the RPL to a block state BK, and the switching device SWb sets the ring port Pr[2] located at the other end of the RPL to the block state BK.

The ring port controlled to the block state BK blocks a passage of a user frame. The user frame mentioned here is, for example, a normal frame for making data communication between the user networks 11a to 11d. Meanwhile, frames include a control frame other than the user frame. The control frame is distinguished from the user frame by a predetermined identifier or the like in the frame, and is used to monitor the presence or absence of fault and control the ring network 10.

When there is no fault on the ring network 10, this RPL prevents the looping of a communication path on the ring network 10. More specifically, as shown in FIG. 1, a communication path 12 via the switching devices SWd and SWc is formed between the switching device SWa and the switching devices SWb. Frame transfer between the user networks 11a to 11e is performed on this communication path 12.

<<Fault Monitoring Method and General Operation at Fault Detection of Relay System (Premise)>>

Figure 2:
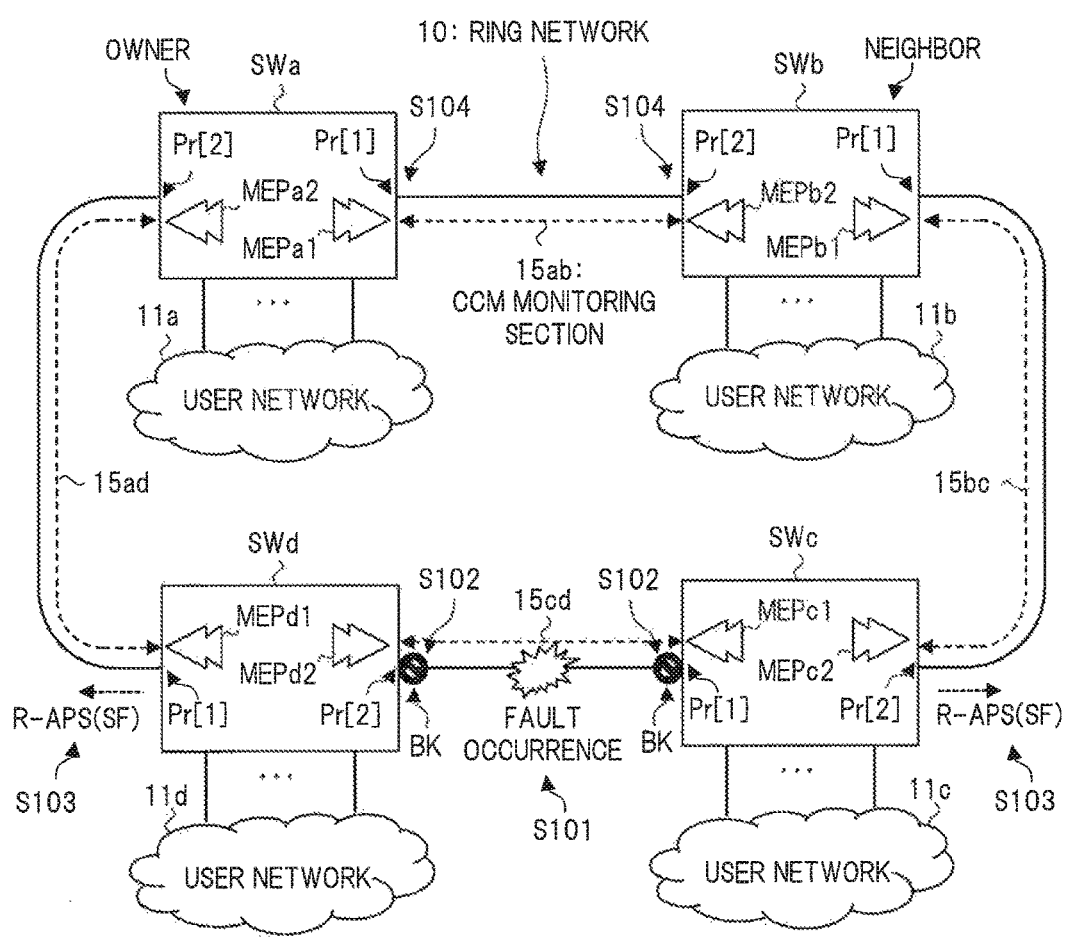
FIG. 2 is a schematic diagram showing a fault monitoring method and an operation example at the time of fault detection in the relay system of FIG. 1.

FIG. 2 is a schematic diagram showing a fault monitoring method and an operation example at the time of fault detection in the relay system of FIG. 1. As shown in FIG. 2, the switching devices SWa to SWd are provided with monitoring points MEPa1 to MEPd1 corresponding to the ring ports Pr[1], and are provided with monitoring points MEPa2 to MEPd2 corresponding to the ring ports Pr[2].

Here, ITU-T G.8032 specifies that a CC (Continuity check) function of Ethernet (registered trademark) OAM is used for monitoring presence or absence of fault in a link between the switching devices. Ethernet OAM has been standardized by "ITU-T Y.1731" and "IEEE802.1ag", etc. as a standard for monitoring the continuity between devices. In the CC function, a monitoring section is set by monitoring points referred to as MEP (Maintenance End Point) as shown in FIG. 2. MEPs at both ends of each monitoring section monitor the continuity of each monitoring section by transmitting and receiving a CCM (Continuity Check Message) frame, which is a continuity monitoring frame, between each other at regular intervals.

In the example of FIG. 2, the monitoring point MEPa1 of the switching device SWa sets a CCM monitoring section 15ab between itself and the monitoring point MEPb2 of a different device (SWb), thereby monitoring the continuity between the ring port Pr[1] of its own device and the ring port Pr[2] of the different device (SWb) connected thereto. Meanwhile, the monitoring point MEPb2 of the switching device SWb also sets the CCM monitoring section 15ab between itself and the monitoring point MEPa1 of a different device (SWa), thereby monitoring the continuity between the ring port Pr[2] of its own device and the ring port Pr[1] of the different device (SWa) connected thereto.

Similarly, the CCM monitoring sections 15bc, 15cd and 15ad are sequentially set on the ring network 10. In each CCM monitoring section (for example, 15ab), the monitoring point of one end (MEPa1) recognizes the continuity with respect to the monitoring point of the other end (MEPb2) as a LOC (Loss Of Continuity) state when it does not receive a CCM frame from the monitoring point of the other end (MEPb2) within a predetermined period. This predetermined period is, for example, 3.5 times as long as a transmission interval of the CCM frame (typically 3.3 ms).

In this case, the monitoring point of one end (MEPa1) transmits the CCM frame having a flag attached to an RDI (Remote Defect Indication) bit when transmitting the CCM frame to the monitoring point of the other end (MEPb2). The monitoring point of the other end (MEPb2) recognizes the continuity with respect to the monitoring point of one end (MEPa1) as an RDI state by receiving the CCM frame having a flag attached to the RDI bit from the monitoring point of one end (MEPa1). Each of the switching devices SWa to SWd determines presence or absence of fault at the ring ports Pr[1] and Pr[2] of its own device based on presence or absence of recognition of a LOC state or an RDI state in the monitoring points (MEP) of its own device.

FIG. 2 shows an example of the general operation in the case where a fault occurs in the monitoring section 15cd between the monitoring point MEPc1 of the switching device SWc and the monitoring point MEPd2 of the switching device SWd (step S101). In this case, the fault is detected by the monitoring points MEPc1 and MEPd2. When the switching device SWc has detected the fault of the ring port Pr[1] by using the monitoring point MEPc1, it controls the ring port Pr[1] to the block state BK (step S102) and transmits a R-APS (SF) frame (short for Ring-Automatic Protection Switching (Signal Fail) frame) to the ring network 10 (step S103). In this specification, the fault of the ring port includes the fault of a communication line (link) connected to the ring port in addition to the fault of the ring port itself.

Similarly, when the switching device SWd has detected the fault of the ring port Pr[2] by using the monitoring point MEPd2, it controls the ring port Pr[2] to the block state BK (step S102) and transmits the R-APS (SF) frame to the ring network 10 (step S103). The R-APS frame is a kind of a control frame based on Ethernet OAM, and is recognized by the value of an OpCode region (see FIG. 4 described later) in the frame or the like. SF denotes a signal failure (Signal Fail), and the R-APS (SF) frame functions as a fault notification frame.

When the switching device SWa serving as an owner node has received the R-APS (SF) frame, it changes the ring port Pr[1] from the block state BK shown in FIG. 1 to an open state (step S104). Similarly, when the switching device SWb serving as a neighbor node has received the R-APS (SF) frame, it also changes the ring port Pr[2] from the block state BK shown in FIG. 1 to an open state (step S104). The ring port in the open state permits the passage of the user frame.

<<Operation at Recovery from Fault of Relay System (Premise)>>

Figure 3:
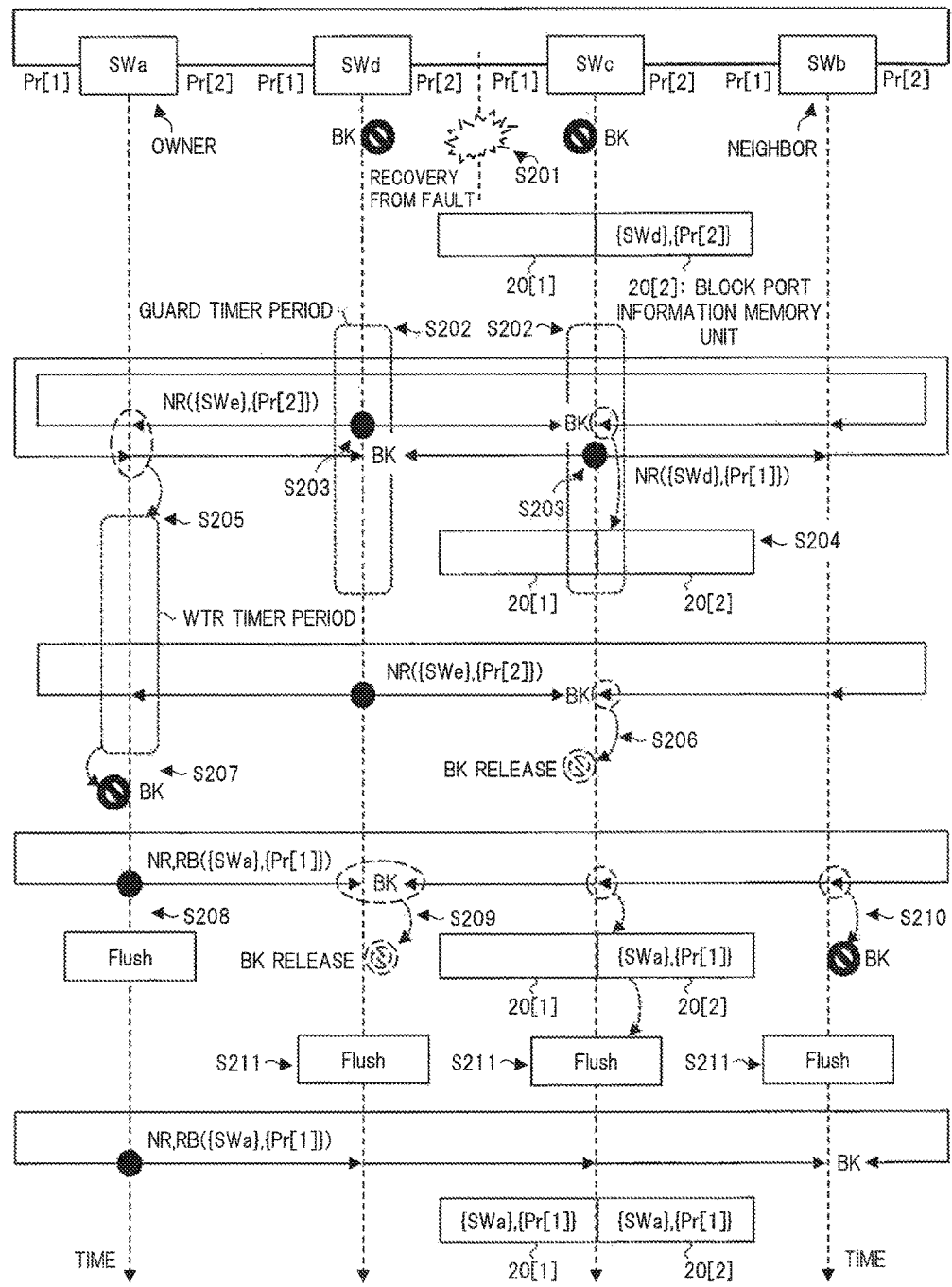
FIG. 3 is a diagram showing an example of an operation sequence at the time of recovery from fault in the relay system of FIG. 1.
Figure 4:
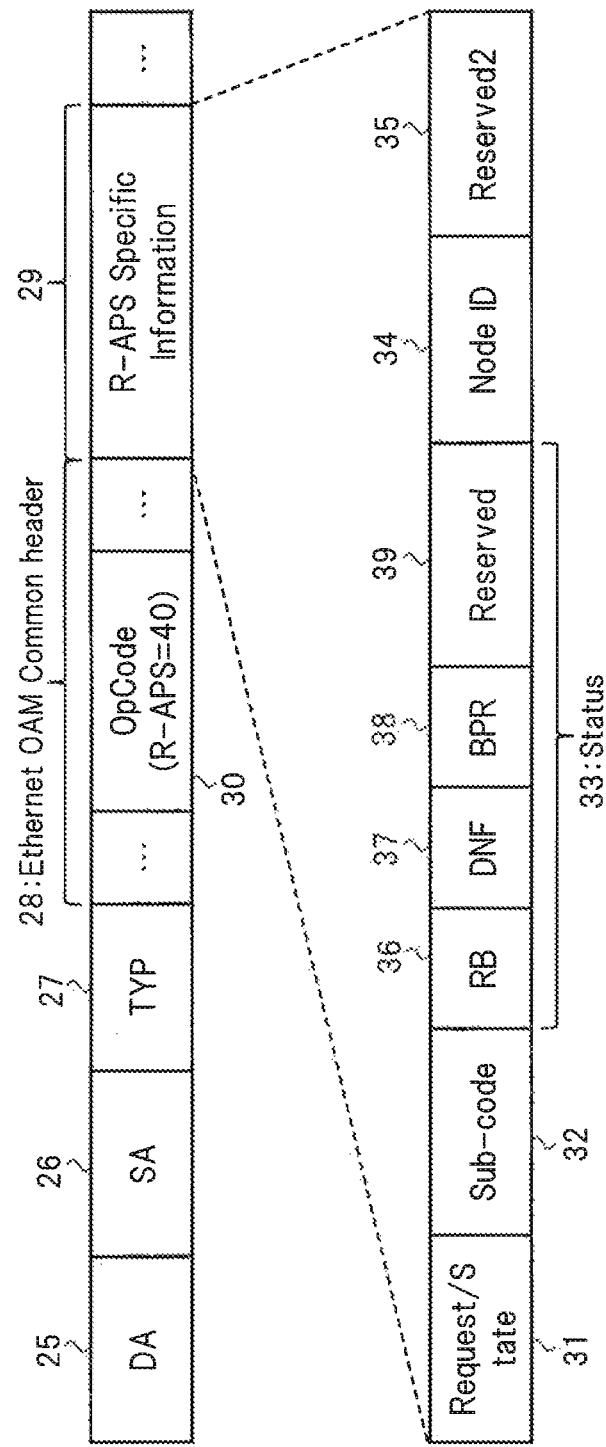
FIG. 4 is a schematic diagram showing a configuration example of an R-APS frame in the relay system of FIG. 1.

FIG. 3 is a diagram showing an example of an operation sequence at the time of recovery from fault in the relay system of FIG. 1. FIG. 4 is a schematic diagram showing a configuration example of the R-APS frame in the relay system of FIG. 1. First, as shown in FIG. 4, the R-APS frame contains a destination MAC address (DA) region 25, a source MAC address (SA) region 26, an Ethernet type (TYP) region 27, an Ethernet OAM common header region 28 and an R-APS specific information region 29. A MAC address of the switching device (any of SWa to SWd) to be the transmission source of the R-APS frame is set as a value of the SA region 26, and a multicast MAC address is set as a value of the DA region 25.

Also, "0x8902" representing the Ethernet OAM is set as a value of the TYP region 27. The Ethernet OAM common header region 28 includes an OpCode (Operation Code) region 30, and "40" is set as a value of the OpCode region 30 in the case of the R-APS frame. The R-APS specific information region 29 includes a 4-bit request/state region 31, a 4-bit sub-code region 32, a status region 33, a 48-bit node ID region 34 and a 24-bit reserved region 35.

A value of the request/state region 31 represents whether the R-APS frame is the above-mentioned R-APS (SF) frame or an R-APS (NR) frame described later. Usually, "0000" is set as a value of the sub-code region 32 and values other than this are preserved for future use. A MAC address of its own node is usually set as a value of the node ID region 34. The status region 33 includes a 1-bit RB region 36, a 1-bit DNF region 37, a 1-bit BPR (Blocked Port Reference) region 38 and a 5-bit reserved region 39.

A value of the RB region 36 represents whether the RPL of FIG. 1 is in a block state or an open state. A value of the DNF region 37 represents whether execution of an FDB (Forwarding DataBase) flush is valid or invalid. A value of the BPR region 38 represents which of the two ring ports Pr[1] and Pr[2] is blocked in, for example, the switching device SWd of FIG. 2.

Next, FIG. 3 will be described. In FIG. 3, the case where a fault occurs in a link between the switching device SWc and the switching device SWd as shown in FIG. 2 and the fault is recovered is assumed. First, in the state where the fault occurs, the ring port Pr[1] of the switching device SWc and the ring port Pr[2] of the switching device SWd are both controlled to the block state BK.

Also, as shown in FIG. 3, each of the switching devices SWa to SWd has block port information memory units 20[1] and 20[2]. In FIG. 3, the block port information memory unit provided in the switching device SWc is shown as a representative of the plurality of switching devices SWa to SWd. When the switching device SWc has received the block port information at the ring port Pr[1], it holds the information in the block port information memory unit 20[1], and when the switching device SWc has received the block port information at the ring port Pr[2], it holds the information in the block port information memory unit 20[2].

In the step S103 of FIG. 2 described above, for example, the R-APS (SF) frame transmitted from the switching device SWd contains the information of the ring port controlled to the block state BK (referred to as block port information). In this example, the block port information is "{SWd}, {Pr[2]}". For example, {SWd} represents the identifier (ID) of the switching device SWd. Similarly, {AA} indicates the identifier of "AA" in this specification. More specifically, {SWd} is a value of the node ID region 34 shown in FIG. 4, and usually corresponds to a MAC address of the switching device SWd. In addition, {Pr[2]} is specifically a value of the BPR region 38 shown in FIG. 4.

The switching device SWc receives the R-APS (SF) frame containing the block port information "{SWd}, {Pr[2]}" at the ring port Pr[2] as shown in FIG. 2. Thus, the switching device SWc holds "{SWd}, {Pr[2]}" in the block port information memory unit 20[2]. When a fault is recovered in such a state (step S201), the process as follows is performed.

The switching device SWc detects the recovery from fault of the ring port Pr[1] by using the monitoring point MEPc1. In this case, the switching device SWc starts a guard timer (step S202), and transmits the R-APS (NR) frame from the ring ports Pr[1] and Pr[2] at regular intervals (step S203). NR denotes absence of request (No Request) and is recognized by the value of the request/state region of FIG. 4. The R-APS (NR) frame mentioned here functions as a fault recovery notification frame (first fault recovery notification frame). In addition, the guard timer is provided for preventing the R-APS frame from being received at a predetermined function block.

Similarly, the switching device SWd detects the recovery from fault of the ring port Pr[2] by using the monitoring point MEPd2. In this case, the switching device SWd starts a guard timer (step S202), and transmits the R-APS (NR) frame (second fault recovery notification frame) from the ring ports Pr[1] and Pr[2] at regular intervals (step S203).

When each of the switching devices SWa to SWd (for example, SWc) has received the R-APS (NR) frame, it deletes the information held in the block port information memory units 20[1] and 20[2](step S204). Also, when the switching device SWa serving as an owner node has received the R-APS (NR) frame, it starts a WTR (Wait To Restore) timer (step S205).

When the period of the guard timer has expired, each of the switching devices SWc and SWd becomes able to receive the R-APS frame at a predetermined function block. Thus, the switching device SWc receives the R-APS (NR) frame (second fault recovery notification frame) from the switching device SWd at the ring port Pr[2], in a state of detecting the recovery from fault of the ring port Pr[i] in the block state BK. Then, the switching device SWc determines which of the device itself and the switching device SWd has higher priority based on the information contained in the received frame (step S206).

Similarly, the switching device SWd also receives the R-APS (NR) frame (first fault recovery notification frame) from the switching device SWc at the ring port Pr[1], in a state of detecting the recovery from fault of the ring port Pr[2] in the block state BK. Then, the switching device SWd performs the priority determination based on the information contained in the received frame. FIG. 3 shows an example in which the switching device SWd has higher priority. In this case, the switching device SWc changes the ring port Pr[1] from the block state BK to the open state (step S206). On the other hand, the switching device SWd maintains the ring port Pr[2] in the block state BK.

When the period of the WRT timer has expired, the switching device SWa serving as an owner node changes the ring port Pr[1] from the open state to the block state BK (step S207). Then, the switching device SWa transmits a first R-APS (NR, NB) frame containing the block port information "{SWa}, {Pr[1]}" from the ring ports Pr[1] and Pr[2] and flushes its own FDB (step S208). RB (short for Ring Protection Link Block or RPL Block) denotes the block of RPL (RPL Blocked) and is recognized by the value of the RB region 36 of FIG. 4. The R-APS (NR, RB) frame (short for Ring-Automatic Protection Switching (No Request, RPL Block) frame) mentioned here functions as a fault switching-back frame.

When the switching device SWd has received the R-APS (NR, RB) frame, it changes the ring port Pr[2] from the block state BK to the open state, and stops the transmission of the R-APS (NR) frame (step S209). Also, when the switching device SWb serving as a neighbor node has received the R-APS (NR, RB) frame, it changes the ring port Pr[2] from the open state to the block state BK (step S210).

Furthermore, in the switching devices SWb to SWd (for example, SWc), a change in the block port information memory units 20[1] and 20[2] (here, 20 [2]) occurs based on the block port information "{SWa}, {Pr[1]}" of the received R-APS (NR, RB) frame. In ITU-T G.8032, the FDB flush is performed when a change occurs in the information in one of the block port information memory units 20[1] and 20[2] and the information mismatches the information of the other. Based on it, each of the switching devices SWb to SWd performs the FDB flush (step S211).

Thereafter, the switching device SWa transmits a second R-APS (NR, RB) frame. In this case, however, since the information of the changed one of the block port information memory units 20[1] and 20[2](here, 20[1]) of the switching device SWc matches the information of the other, the FDB flush is not performed. Note that each R-APS frame is transmitted three times every 3.3 ms, and is thereafter transmitted every 5 s based on ITU-T G.8032.

<<Problem of Relay System (Premise)>>

Here, the above-described determination of the priority in the step S206 of FIG. 3 is usually performed based on the value of the node ID region 34 of FIG. 4. Usually, the MAC address is set as the value of the node ID region 34. Namely, the switching device SWc of FIG. 3 compares the MAC address contained in the R-APS (NR) frame from the switching device SWd with its own MAC address to perform the priority determination. However, since the MAC address is usually set fixedly by a device vendor, it is difficult for a user to arbitrarily determine the ring port to be opened at the time of recovery from fault.

<<Configuration and Operation of Switching Device (First Embodiment)>>

Figure 5:
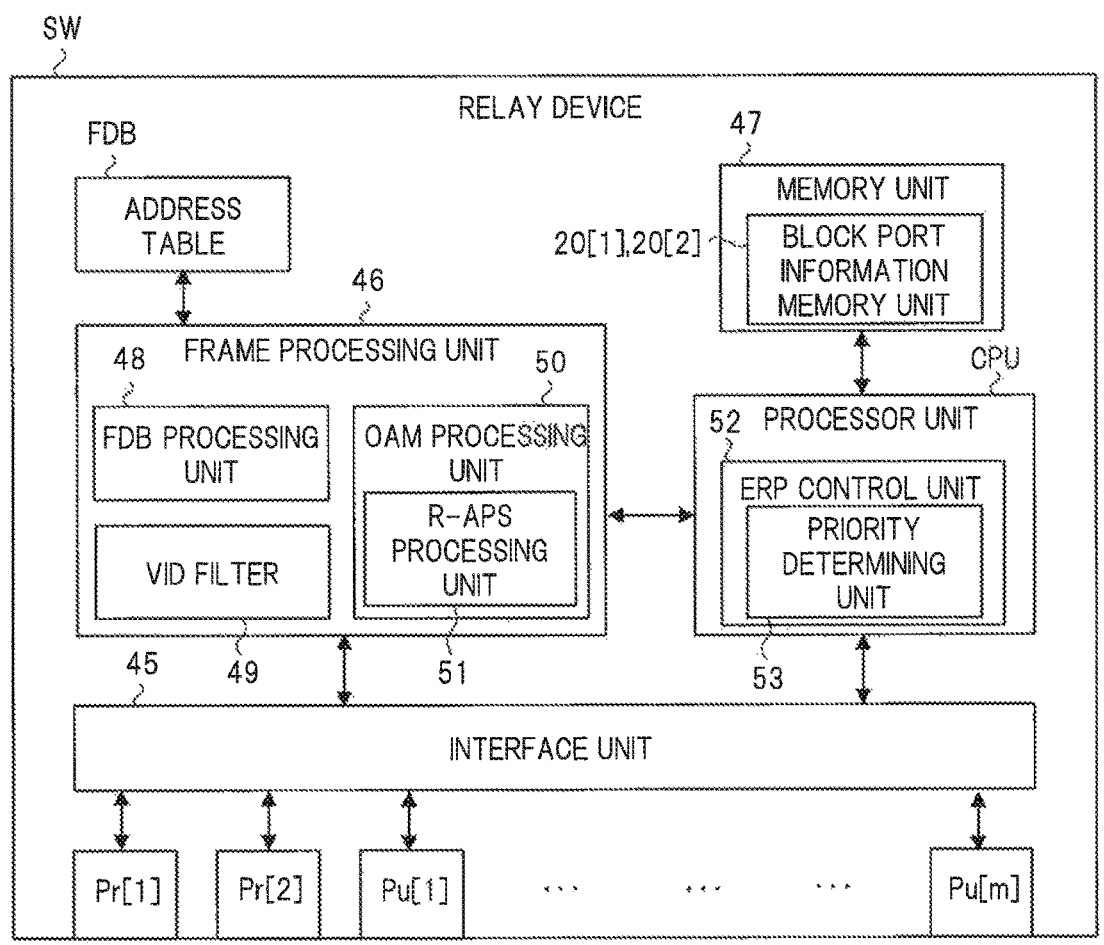
FIG. 5 is a schematic diagram showing a configuration example of a main part of a switching device in the relay system of FIG. 4.
Figures 6A, 6B:
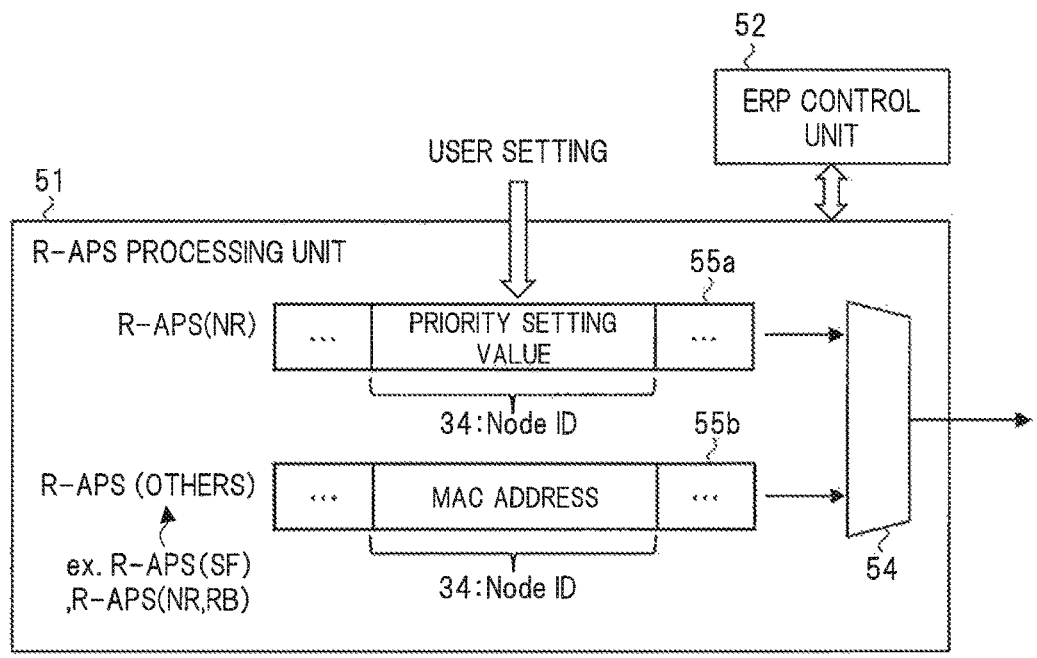
FIG. 6A is a conceptual diagram showing a configuration example and an operation example of a main part around an R-APS processing unit in FIG. 5.
FIG. 6B is a schematic diagram showing a configuration example of an address table in FIG. 5.

FIG. 5 is a schematic diagram showing a configuration example of a main part of a switching device in the relay system of FIG. 1. FIG. 6A is a conceptual diagram showing a configuration example and an operation example of a main part around an R-APS processing unit in FIG. 5 and FIG. 6B is a schematic diagram showing a configuration example of an address table in FIG. 5. A switching device SW shown in FIG. 5 is applied to at least one of the switching devices SWa to SWd shown in FIG. 1.

The switching device SW shown in FIG. 5 includes two ring ports Pr[1] and Pr[2], a plurality of user ports Pu[1] to Pu[m], various processing units and others. As shown in FIG. 1, the ring ports Pr[1] and Pr[2] are connected to the ring network 10 through a communication line (for example, Ethernet line). The plurality of user ports Pu[1] to Pu[m] are connected to a predetermined user network (any of 11a to 11d). Hereinafter, various processing units will be described.

When an interface unit 45 has received a frame at any of the plurality of ports (ring ports Pr[1] and Pr[2] and user ports Pu[1] to Pu[m]), it adds an identifier of the port that has received the frame (referred to as reception port identifier) to the frame, and then transmits the frame to a frame processing unit 46 or a processor unit CPU. In addition, the interface unit 45 transmits a frame from the frame processing unit 46 or the processor unit CPU to any of the plurality of ports based on a destination port identifier described later.

An address table FDB holds a correspondence relation among a MAC address, a VLAN (Virtual LAN) identifier (VID) and a plurality of ports as shown in FIG. 6B. In FIG. 6B, for example, a correspondence relation among a MAC address "MAa" of a terminal included in the user network 11a, a VID "1" and a port identifier {Pu[1]} of a user port is held. In addition, a correspondence relation among a MAC address "MAb" of a terminal included in the user network 11b, a VID "1" and a port identifier {Pr[2]} of a ring port is held.

The frame processing unit 46 includes an FDB processing unit 48, a VID filter 49 and an OAM processing unit 50. The FDB processing unit 48 performs the process to the address table FDB. Specifically, when receiving a frame (for example, user frame) at any of the plurality of ports, the FDB processing unit 48 performs a learning process and a retrieval process to the address table FDB.

In the learning process, the FDB processing unit 48 learns a source MAC address contained in the received user frame to the address table FDB in association with a predetermined VID and a reception port identifier added by the interface unit 45. The predetermined VID is determined by a so-called tag VLAN, a port VLAN and others. In the retrieval process, the FDB processing unit 48 retrieves the address table FDB with using a destination MAC address contained in the received user frame and a VID corresponding to the destination MAC address as retrieval keys. The FDB processing unit 48 adds a port identifier obtained by the retrieval result (referred to as destination port identifier) to the user frame, and transmits the user frame to the interface unit 45.

The VID filter 49 determines whether or not a frame may be relayed in accordance with the VID. For example, the block state BK shown in FIG. 1 and others is realized by this VID filter 49. The OAM processing unit 50 has the monitoring points (MEP) shown in FIG. 2, and monitors continuity based on the Ethernet OAM. In addition, the OAM processing unit 50 has an R-APS processing unit (control frame processing unit) 51.

The R-APS processing unit (control frame processing unit) 51 performs the transmission and reception of various R-APS frames based on ITU-T G.8032. For example, as shown in the step S203 of the switching device SWc of FIG. 3, when the recovery from fault of the ring port Pr[1] in the block state BK is detected, the R-APS processing unit 51 transmits the R-APS (NR) frame (first fault recovery notification frame) from the ring ports Pr[1] and Pr[2]. In addition, the R-APS processing unit 51 receives the R-APS (NR) frame (second fault recovery notification frame) from a different switching device (for example, SWd) at the ring port Pr[2].

Furthermore, as shown in the step S103 of the switching device SWc of FIG. 2, when the fault of the ring port Pr[1] is detected, the R-APS processing unit 51 transmits the R-APS (SF) frame from the ring ports Pr[1] and Pr[2]. Note that, when the R-APS processing unit 51 has received the R-APS frame, it transmits various kinds of control information (for example, information of R-APS specific information region 29 of FIG. 4) contained in the R-APS frame to an ERP control unit 52 described later. Contrary to that, the R-APS processing unit 51 generates an R-APS frame containing various kinds of control information transmitted from the ERP control unit 52, and transmits the R-APS frame to a predetermined ring port.

The processor unit CPU performs the various communication protocol processes, for which complicated process is required, in cooperation with the frame processing unit 46 or manages the overall switching device based on software (firmware) stored in a memory unit 47. The memory unit 47 includes the block port information memory units 20[1] and 20[2] shown in FIG. 3 in addition to the firmware.

The processor unit CPU is provided with an ERP control unit (ring control unit) 52 configured by executing firmware. The ERP control unit (ring control unit) 52 controls the ring network based on the ring protocol specified by ITU-T G.8032. For example, as shown in the step S102 of FIG. 2, when a fault of the ring port is detected through the monitoring point (MEP) in the OAM processing unit 50, the ERP control unit 52 controls the ring port to the block state BK through the VID filter 49. In addition, as shown in the step S209 of FIG. 3, when the recovery from fault of the ring port is detected and a predetermined R-APS frame is received, the ERP control unit 52 controls the ring port to the open state through the VID filter 49. The ERP control unit 52 totally performs the various processes including those based on the ring protocol described in FIG. 2 and FIG. 3.

In the configuration like this, for example, the R-APS processing unit 51 conceptually has the configuration shown in FIG. 6A. The R-APS processing unit 51 shown in FIG. 6A includes packet memories 55a and 55b which hold various kinds of information in the R-APS frame to be transmitted and a selection unit 54 which selects which of the information held in the packet memory 55a or the information held in the packet memory 55b is read. In this case, the packet memory 55a holds the various kinds of information in the R-APS (NR) frame, and the packet memory 55b holds the various kinds of information in the R-APS frame except the R-APS (NR) frame (for example, R-APS (SF) frame and R-APS (NR, RB) frame).

Here, for example, when the R-APS (NR) frame is to be transmitted, the ERP control unit 52 issues an instruction to the R-APS processing unit 51 to read the packet memory 55a. The packet memory (holding unit) 55a holds a priority setting value arbitrarily set by a user in a predetermined region. In this case, the predetermined region is the node ID region 34. Specifically, a user sets a priority setting value to the switching device SW in advance by using a management terminal or the like, and the packet memory 55a holds the priority setting value. As a result, when transmitting the R-APS (NR) frame through the selection unit 54 in accordance with the instruction of the ERP control unit 52, the R-APS processing unit 51 sets the priority setting value as the value of a predetermined region of the R-APS (NR) frame (node ID region 34).

On the other hand, for example, when the R-APS frame except the R-APS (NR) frame (for example, R-APS (SF) frame) is to be transmitted, the ERP control unit 52 issues an instruction to the R-APS processing unit 51 to read the packet memory 55b. The packet memory 55b holds the MAC address of its own device in the node ID region 34 as usual. As a result, when transmitting the R-APS (SF) frame or the like through the selection unit 54 in accordance with the instruction of the ERP control unit 52, the R-APS processing unit 51 sets the MAC address of its own device as the value of the node ID region 34 of the R-APS (SF) frame or the like. Note that the information of each region other than the node ID region 34 in each R-APS frame (that is, packet memories 55*a* and 55*b*) is arbitrarily set by the ERP control unit 52.

In addition, in FIG. 5, the ERP control unit (ring control unit) 52 includes a priority determining unit 53 for performing the above-described process of the step S206 in the switching device SWc of FIG. 3. The ring control unit (specifically, priority determining unit 53) compares the priority based on the value of the node ID region 34 of the R-APS (NR) frame (first fault recovery notification frame) transmitted by its own device and the value of the node ID region 34 of the R-APS (NR) frame (second fault recovery notification frame) transmitted by a different device as usual. Then, the priority determining unit 53 determines whether the ring port is maintained in the block state BK or changed from the block state BK to the open state based on the comparison result.

<<Main Effect of First Embodiment>>

By using the relay system and the switching device of the first embodiment described above, a user can arbitrarily set the priority setting value (specifically, value of node ID region 34) to the switching device, and thus can arbitrarily determine the ring port to be opened at the time of recovery from fault. As a result, for example, the reliability of the relay system can be improved in some cases. Specifically, the switching devices SWa to SWd sometimes have different reliabilities depending on the presence or absence of various redundancy functions in the device or the presence or absence of a device redundancy function to regard a plurality of switching devices as one switching device. In such a case, for example, by setting the value of the node ID region 34 so that the ring port of the switching device with higher priority is opened, the improvement of the reliability as a relay system can be achieved.

However, when the case where the switching device SW of FIG. 5 is applied to a part of the switching devices SWa to SWd (that is, the case where it is used in combination with already existing switching devices) is assumed, another problem may arise when making it possible to arbitrarily set the value of the node ID region 34. Specifically, first, in the R-APS (SF) frame, the R-APS (NR, RB) frame and others, the value of the node ID region 34 is used to determine whether the FDB flush is necessary or not as shown in FIG. 3.

In order to normally perform the determination operation like this, the value of the node ID region 34 of the node in the ring network 10 must be set so as not duplicate with those of all of the other nodes. Furthermore, for example, when the nodes on both sides are the already existing switching devices, the value of the node ID region 34 for achieving the above-described effect is restricted by the MAC addresses of the nodes on both sides, and the value of the node ID region 34 must be set under the restriction in consideration of the duplication with the values of the other nodes. For this reason, the load on the user increases and the setting error by the user is likely to occur.

Thus, in the first embodiment, as shown in FIG. 6A, the value of the node ID region 34 set by a user can be used only when transmitting the R-APS (NR) frame. The value of the node ID region 34 in the R-APS (NR) frame is used to determine the priority of the node as shown in FIG. 3 and does not relate to the determination of whether the FDB flush is necessary or not. Therefore, the user does not need to set the value of the node ID region 34 in consideration of all of the nodes in the ring network 10, and can set the value of the node ID region 34 in consideration of only the nodes on the both sides. Namely, even if the value of the node ID region 34 duplicates with the value of the node ID region 34 of each node except the nodes on the both sides, no particular problem occurs. In this manner, the load on the user can be greatly reduced.

Note that FIG. 6A shows a conceptual configuration of the R-APS processing unit 51, but various other formations may be used for an actual configuration. For example, it is also possible to adopt the configuration in which the R-APS processing unit 51 transmits all of the R-APS frames from one packet memory and the ERP control unit 52 arbitrarily changes the information held in the one packet memory in accordance with each R-APS frame. In this case, for example, when the ERP control unit 52 instructs the R-APS processing unit 51 to transmit the R-APS (NR) frame, it transmits the priority setting value set by the user together, and the R-APS processing unit 51 writes the priority setting value to the node ID region 34.

Second Embodiment

Configuration and Operation of Switching Device (Second Embodiment)

Figure 7A:
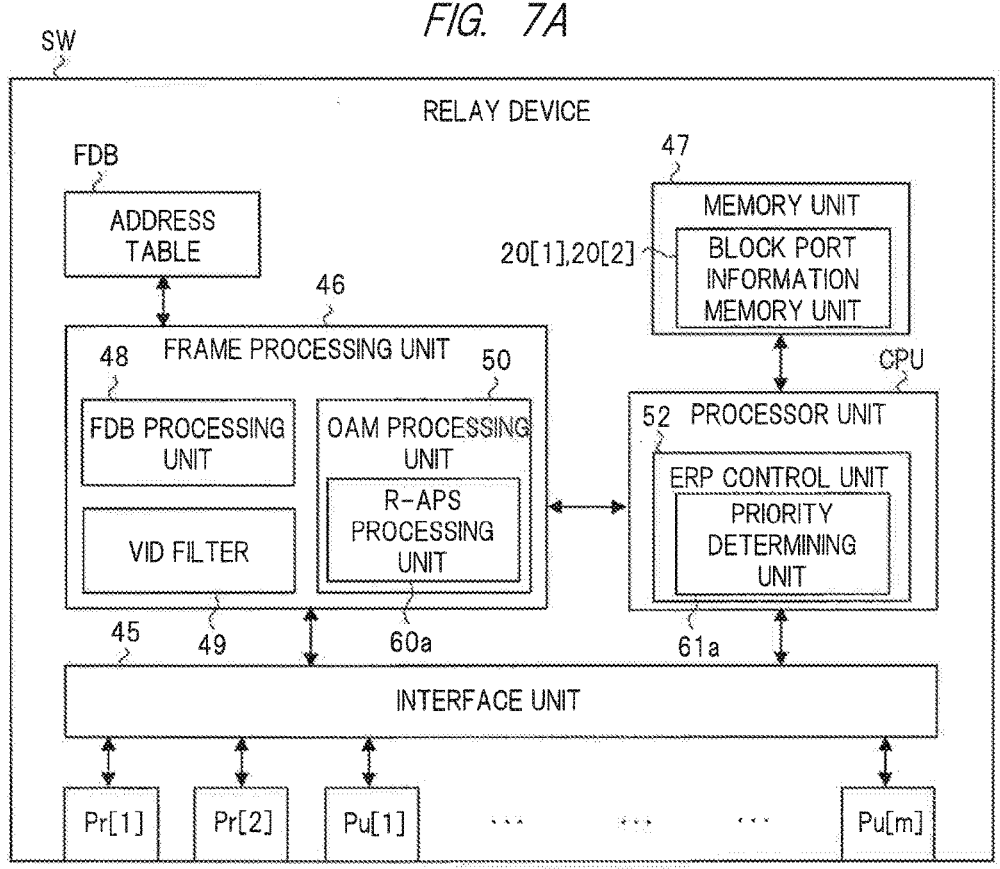
FIG. 7A is a schematic diagram showing a configuration example of a main part of a switching device according to the second embodiment of the present invention.
Figure 7B:
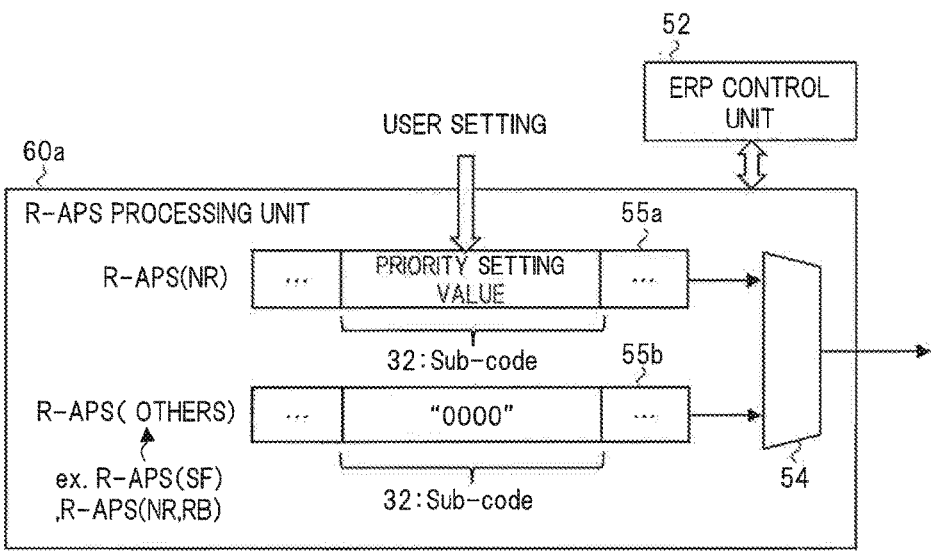
FIG. 7B is a conceptual diagram showing a configuration example and an operation example of a main part around an R-APS processing unit in FIG. 7A.

FIG. 7A is a schematic diagram showing a configuration example of a main part of a switching device according to the second embodiment of the present invention, and FIG. 7B is a conceptual diagram showing a configuration example and an operation example of a main part around an R-APS processing unit in FIG. 7A. A switching device SW shown in FIG. 7A is different from the configuration example of FIG. 5 described above in a part of the configuration and operation of an R-APS processing unit (control frame processing unit) 60*a* and a priority determining unit 61*a* in the ERP control unit (ring control unit) 52. Hereinafter, the difference will be described in detail below.

As described in FIG. 7B, the R-APS processing unit (control frame processing unit) 60*a* has substantially the same configuration and performs substantially the same operation as the case of FIG. 6A. However, the packet memory (holding unit) 55*a* in the R-APS processing unit 60*a* of FIG. 7B is different from that of FIG. 6A in the predetermined region for holding the priority setting value. This packet memory (holding unit) 55*a* holds the priority setting value arbitrarily set by a user in a sub-code region (first region) 32 different from the node ID region 34. As a result, when transmitting the R-APS (NR) frame (first fault recovery notification frame) through the selection unit 54 in accordance with the instruction of the ERP control unit 52, the R-APS processing unit 60*a* sets the priority setting value as the value of the predetermined region (sub-code region 32) of the R-APS (NR) frame.

On the other hand, the packet memory 55*b* holds a predetermined value (specifically, "0000") specified by ITU-T G.8032 in the sub-code region (first region) 32. As a result, when transmitting the R-APS (SF) frame or the like through the selection unit 54 in accordance with the instruction of the ERP control unit 52, the R-APS processing unit 60*a* sets the predetermined value set in advance ("0000") as the value of the sub-code region 32 of the R-APS (SF) frame or the like.

Figure 8:
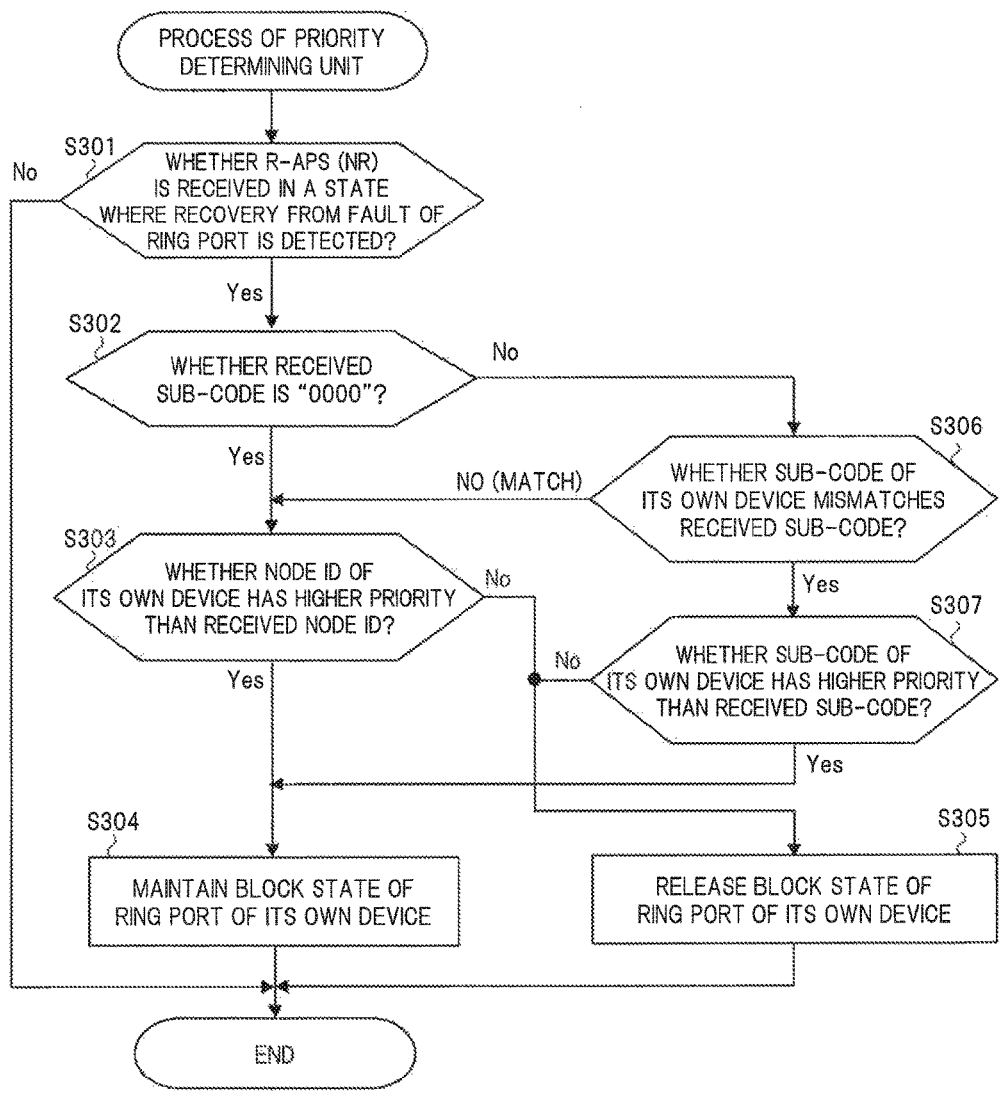
FIG. 8 is a flowchart showing an operation example of a priority determining unit in the switching device of FIG. 7A.

FIG. 8 is a flowchart showing an operation example of the priority determining unit in the switching device of FIG. 7A. The ring control unit (priority determining unit 61*a*) of FIG. 7A schematically compares the priority based on the value of the sub-code region (first region) 32 of the R-APS (NR) frame (first fault recovery notification frame) transmitted from its own device and the value of the sub-code region 32 of the R-APS (NR) frame (second fault recovery notification frame) transmitted from a different device in correspondence with FIG. 7B. Then, based on the comparison result, the priority determining unit 61a determines whether the ring port is maintained in the block state BK or changed from the block state BK to the open state.

In more detail, as shown in FIG. 8, in the case of detecting the recovery from fault of the ring port in the block state BK, the ring control unit (priority determining unit 61a) determines whether the R-APS (NR) frame (second fault recovery notification frame) from the different device has been received (step S301). Next, the priority determining unit 61a determines whether the value of the sub-code region (first region) 32 contained in the R-APS (NR) frame from the different device is a predetermined value set in advance ("0000") (step S302).

When the value of the sub-code region (first region) 32 is the predetermined value ("0000"), the priority determining unit 61a compares the priority based on the value of the node ID region 34 of the R-APS (NR) frame transmitted from its own device and the value of the node ID region 34 of the R-APS (NR) frame transmitted from the different device (step S303). Namely, the priority determining unit 61a compares the MAC address of its own device and the MAC address of the different device. Then, based on the comparison result, the priority determining unit 61a determines whether the ring port of its own device is maintained in the block state BK or changed from the block state BK to the open state (steps S304 and S305).

Specifically, when the value of the node ID region 34 of its own device has higher priority than the value of the node ID region 34 of the different device, the priority determining unit 61a maintains the ring port of its own device in the block state BK (step S304). On the other hand, when it has lower priority, the priority determining unit 61a changes the ring port of its own device from the block state BK to the open state (step S305).

Also, when the value of the sub-code region (first region) 32 is not the predetermined value ("0000") in the step S302, the priority determining unit 61a performs the comparison of the priority based on the sub-code region 32 (steps S306 and S307). Specifically, the priority determining unit 61a determines whether the value of the sub-code region 32 of its own device mismatches the value of the sub-code region 32 of the different device (step S306). In the case of match, the priority determining unit 61a performs the process of the step S303. Meanwhile, in the case of mismatch, the priority determining unit 61a determines whether the ring port of its own device is maintained in the block state BK or changed from the block state BK to the open state based on the result of the priority comparison using the values of the sub-code regions 32 (steps S304 and S305).

As described above, by using the relay system and the switching device of the second embodiment, it becomes possible for a user to arbitrarily set the ring port to be opened at the time of recovery from fault like the case of the first embodiment. In addition, like the case of the first embodiment, it can be used in combination with already existing switching devices. Namely, in the already existing switching device, "0000" is usually set as the value of the sub-code region 32 of various R-APS frames. Therefore, when performing the priority comparison between the switching device SW of FIG. 7A and an already existing switching device, the switching device SW of FIG. 7A can keep the compatibility with the already existing switching device by using the value of the node ID region 34 (steps S302 and S303).

Note that, based on ITU-T G.8032, the value of the sub-code region 32 has significance when the value of the request/state region 31 is a specific value. Namely, the value of the sub-code region 32 has significance when the value of the request/state region 31 is "1110" and the value of the sub-code region 32 is "0000" (that is, in the case of the R-APS frame requesting the FDB flush), and it has no particular significance in the R-APS (NR) frame, the R-APS (SF) frame and the R-APS (NR, RB) frame described above.

Therefore, the priority setting value may be set as the value of the sub-code region 32 not only when transmitting the R-APS (NR) frame but also when transmitting other R-APS frames (except R-APS frame requesting FDB flush) as shown in FIG. 7A. However, from the viewpoint of preventing an unanticipated situation and improving the safety, it is desirable to limit to the R-APS (NR) frame.

Third Embodiment

Configuration and Operation of Switching Device (Third Embodiment)

Figure 9A:
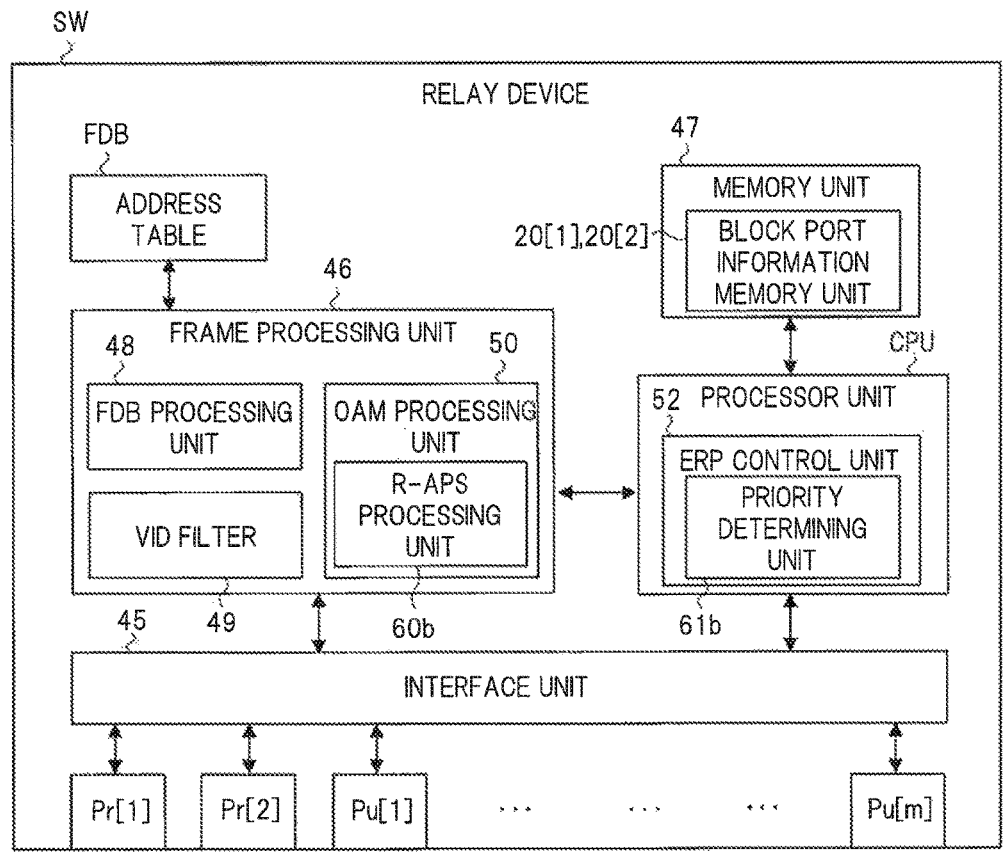
FIG. 9A is a schematic diagram showing a configuration example of a main part in a switching device according to the third embodiment of the present invention.
Figure 9B:
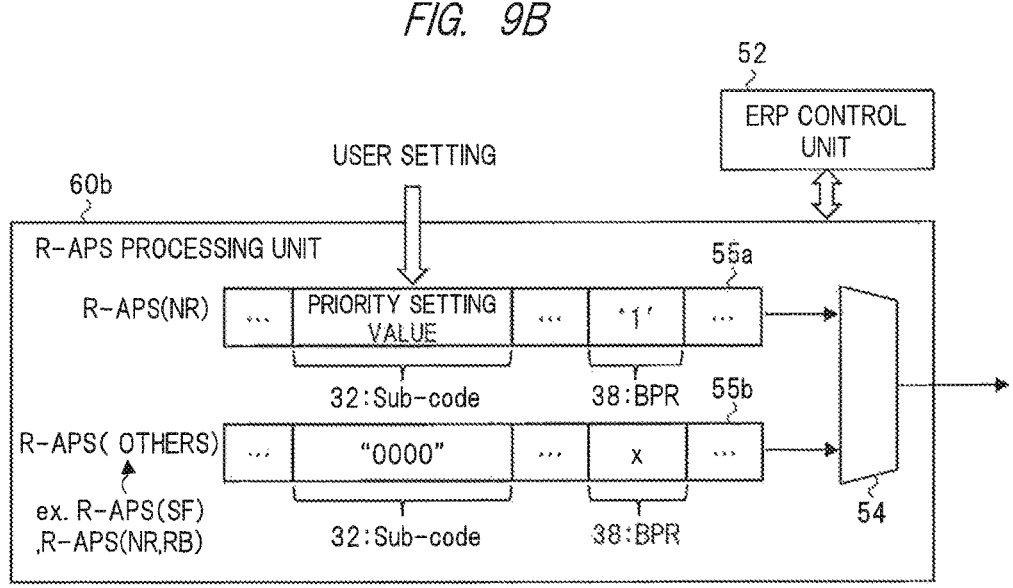
FIG. 9B is a conceptual diagram showing a configuration example and an operation example of a main part around an R-APS processing unit in FIG. 9A.

FIG. 9A is a schematic diagram showing a configuration example of a main part in a switching device according to the third embodiment of the present invention, and FIG. 9B is a conceptual diagram showing a configuration example and an operation example of a main part around an R-APS processing unit in FIG. 9A. A switching device SW shown in FIG. 9A is different from the configuration example of FIG. 7A described above in a part of the configuration and the operation of an R-APS processing unit (control frame processing unit) 60b and a priority determining unit 61b in the ERP control unit (ring control unit) 52. Hereinafter, the difference will be described in detail below.

As shown in FIG. 9B, the R-APS processing unit (control frame processing unit) 60b has substantially the same configuration and performs substantially the same operation as the case of FIG. 7B. However, the packet memory (holding unit) 55a in the R-APS processing unit 60b of FIG. 9B holds the priority setting value in the sub-code region (first region) 32 like the case of FIG. 7B and further holds an operation identification value (here, '1') in the BPR region (second region) 38. As a result, when transmitting the R-APS (NR) frame (first fault recovery notification frame) through the selection unit 54 in accordance with the instruction from the ERP control unit 52, the R-APS processing unit 60b sets the operation identification value as the value of the BPR region 38 of the R-APS (NR) frame.

Furthermore, the packet memory 55b in the R-APS processing unit 60b of FIG. 9B holds a predetermined value ("0000") in the sub-code region 32 like the case of FIG. 7B and further holds a value based on ITU-T G.8032 ('x') in the BPR region 38. The value ('x') is a value representing the blocked ring port ('0' or '1') as described in FIG. 4.

As shown in FIG. 3, the value of the BPR region (second region) 38 is used to determine whether the FDB flush is necessary or not in the R-APS (SF) frame or the like, but is not particularly used in the R-APS (NR) frame. Thus, in the third embodiment, the value of the BPR region 38 in the R-APS (NR) frame is used as a marker (operation identification value) for determining whether or not the priority comparison based on the sub-code region 32 can be performed.

Figure 10:
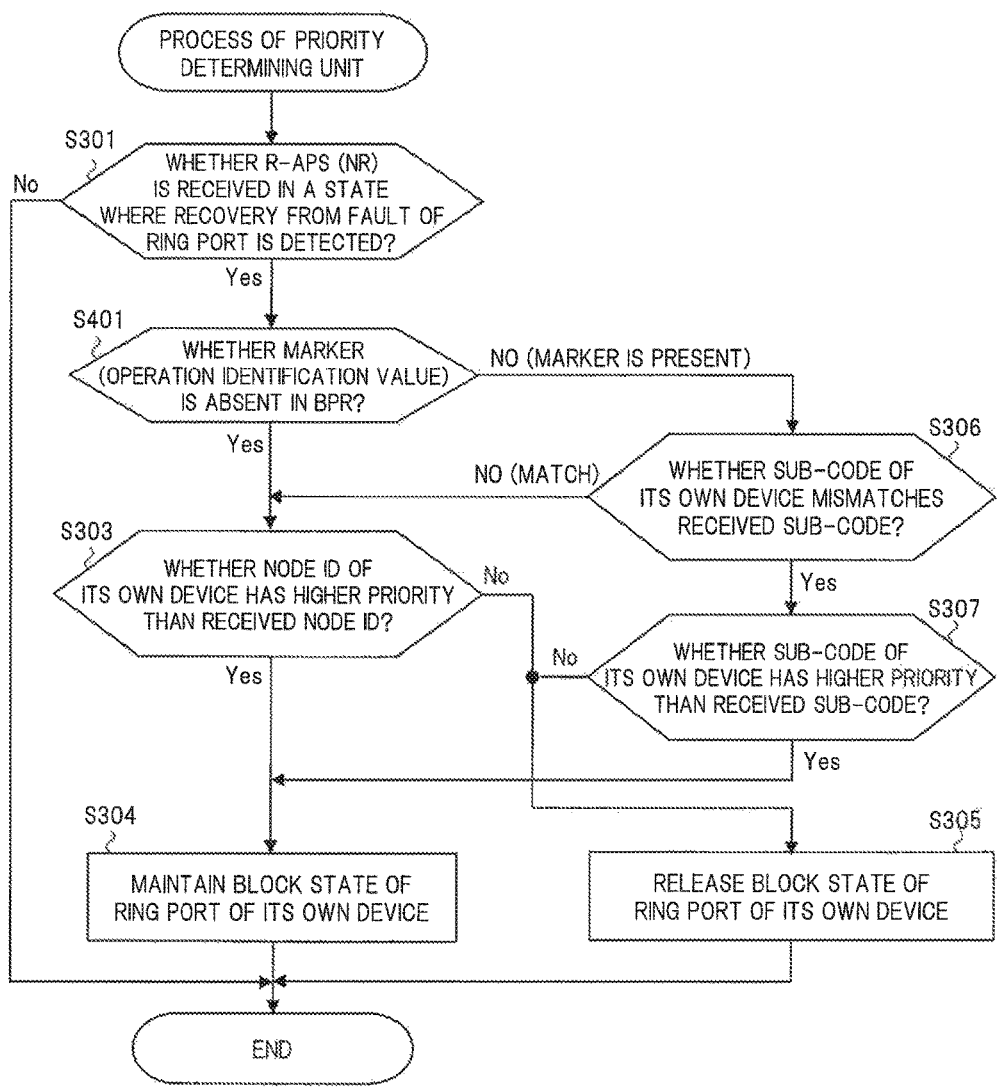
FIG. 10 is a flowchart showing an operation example of a priority determining unit in the switching device of FIG. 9A.

FIG. 10 is a flowchart showing an operation example of the priority determining unit in the switching device of FIG. 9A. In the flow shown in FIG. 10, in comparison with the flow shown in FIG. 8, the process of the step S302 in FIG.

8 is replaced with the process of the step S401 in FIG. 10. Namely, in the step S302 of FIG. 8, the priority determining unit 61a selects whether the priority comparison is performed based on the sub-code region 32 or the priority comparison is performed based on the node ID region 34, depending on whether the value of the sub-code region 32 is a predetermined value ("0000") or not. Meanwhile, in the step S401 of FIG. 10, the priority determining unit 61b performs this selection depending on the presence or absence of the marker (operation identification value) in the BPR region (second region) 38.

Specifically, when the value of the BPR region (second region) 38 of the R-APS (NR) frame (second fault recovery notification frame) from the different device is the operation identification value ('1') in the step S401, the flow proceeds to the step S306 and the ring control unit (priority determining unit 61b) of FIG. 9A performs the priority comparison based on the sub-code region (first region) 32. On the other hand, when the value of the BPR region 38 is not the operation identification value in the step S401, the flow proceeds to the step S303 and the priority determining unit 61b performs the priority comparison based on the node ID region 34. Thereafter, the priority determining unit 61b determines whether the ring port of its own device is maintained in the block state BK or changed from the block state BK to the open state based on the result of the priority comparison through the same processes as those in the case of FIG. 8 (steps S304 and S305).

As described above, by using the relay system and the switching device of the third embodiment, it becomes possible for a user to arbitrarily set the ring port to be opened at the time of recovery from fault like the case of the first embodiment. In addition, like the case of the first embodiment, it can be used in combination with already existing switching devices. Namely, in the already existing switching device, a default value "0" is usually set as the value of the BPR region 38 of the R-APS (NR) frame. Therefore, when performing the priority comparison between the switching device SW of FIG. 9A and an already existing switching device, the switching device SW of FIG. 9A can keep the compatibility with the already existing switching device by using the value of the node ID region 34 (steps S401 and S303).

Fourth Embodiment

Configuration and Operation of Switching Device (Fourth Embodiment)

Figure 11:
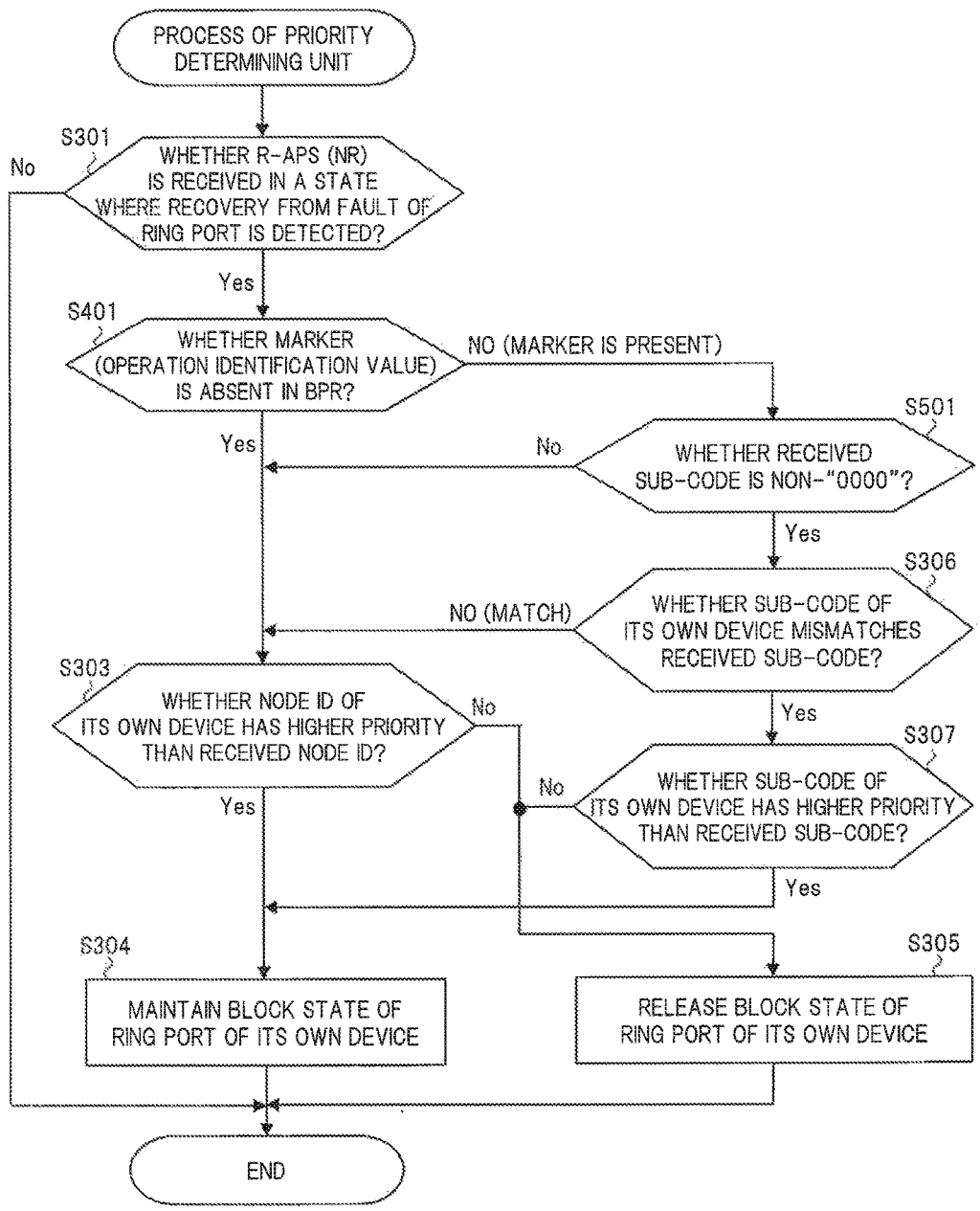
FIG. 11 is a flowchart showing an operation example of a priority determining unit in a switching device according to the fourth embodiment of the present invention.

FIG. 11 is a flowchart showing an operation example of a priority determining unit in a switching device according to the fourth embodiment of the present invention. The switching device of the fourth embodiment has the configuration similar to that shown in FIG. 9A and FIG. 9B, but the operation of the priority determining unit is different from that of FIG. 10. In comparison with the flow shown in FIG. 10, the process of the step S501 is added to the flow shown in FIG. 11.

In FIG. 11, the ring control unit (priority determining unit) determines the presence or absence of the marker (operation identification value) in the BPR region 38 like the case of FIG. 10 (step S401). When the marker is absent, like the case of FIG. 10, the flow proceeds to the step S303 and the priority determining unit performs the priority comparison based on the node ID region 34. On the other hand, when the marker is present, the flow proceeds to the step S501 and the priority determining unit determines whether the value of the sub-code region 32 is a predetermined value ("0000") like the case of the step S302 of FIG. 8.

When the value of the sub-code region 32 is the predetermined value ("0000") in the step S501, the flow proceeds to the step S303 and the priority determining unit performs the priority comparison based on the node ID region 34. On the other hand, when the value of the sub-code region 32 is not the predetermined value ("0000") in the step S501, the flow proceeds to the step S306 and the priority determining unit performs the priority comparison based on the node ID region 34. Thereafter, the priority determining unit determines whether the ring port of its own device is maintained in the block state BK or changed from the block state BK to the open state based on the result of the priority comparison through the same processes as those in the case of FIG. 10 (steps S304 and S305).

As described above, the relay system and the switching device of the fourth embodiment are something like a combination of the second embodiment and the third embodiment. Therefore, in addition to being able to obtain the same effects as those of the second and third embodiments, it is possible to further improve the safety. Namely, it is probable in the already existing switching device that the value of the BPR region 38 of the R-APS (NR) frame is '1' for any reason and the value of the sub-code region 32 is a non-"0000" for any reason. However, since the probability of simultaneously satisfying both of them is low, the sufficient safety can be ensured.

Specifically, in FIG. 3, when the switching device SWc performs the priority comparison based on the sub-code region 32 and the already existing switching device SWd performs the priority comparison based on the node ID region 34 as usual, there is a fear that the ring ports of the switching devices SWc and SWd are both brought into the open state. The situation like this can be prevented by using the method of the fourth embodiment.

Fifth Embodiment

Configuration and Operation of Switching Device (Fifth Embodiment)

Figure 12A:
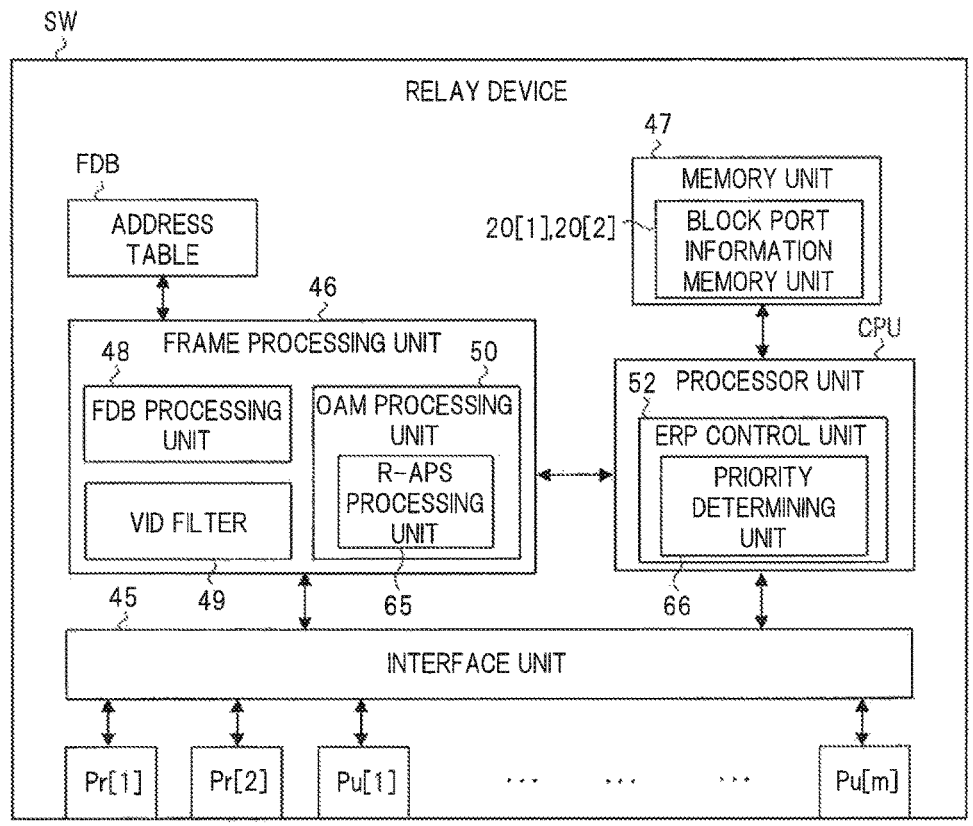
FIG. 12A is a schematic diagram showing a configuration example of a main part of a switching device according to the fifth embodiment of the present invention.
Figure 12B:
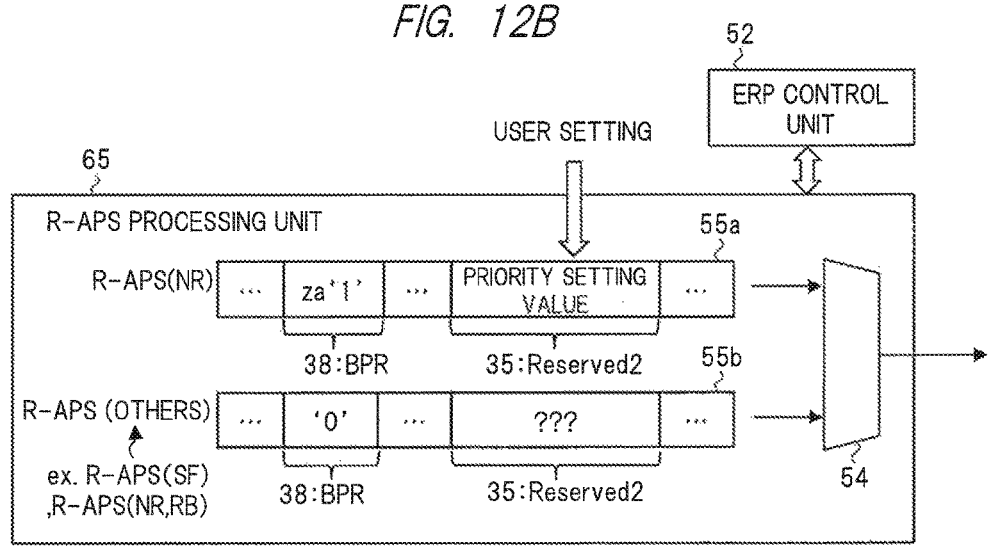
FIG. 12B is a conceptual diagram showing a configuration example and an operation example of a main part around an R-APS processing unit in FIG. 12A.

FIG. 12A is a schematic diagram showing a configuration example of a main part of a switching device according to the fifth embodiment of the present invention, and FIG. 12B is a conceptual diagram showing a configuration example and an operation example of a main part around an R-APS processing unit in FIG. 12A. A switching device SW shown in FIG. 12A is different from the configuration example of FIG. 9A described above in a part of the configuration and the operation of an R-APS processing unit (control frame processing unit) 65 and a priority determining unit 66 in the ERP control unit (ring control unit) 52. Hereinafter, the difference will be described in detail below.

As shown in FIG. 12B, the R-APS processing unit (control frame processing unit) 65 has substantially the same configuration and performs substantially the same operation as the case of FIG. 9A. However, the packet memory (holding unit) 55a in the R-APS processing unit 65 of FIG. 12B is different from that in FIG. 9B in the predetermined region to hold the priority setting value. The packet memory 55a holds the priority setting value arbitrarily set by a user in the reserved region 35. On the other hand, the packet memory 55b holds a certain value, which is not particularly limited, in the reserved region 35. In response to this, the priority determining unit 66 performs the operation using the reserved region 35 instead of the sub-code region 32 in FIG. 10.

As described above, the region to hold the priority setting value is not necessarily limited to the sub-code region 32, and may be the reserved region 35 as shown in FIG. 12B and may similarly be the reserved region 39 of FIG. 4. Furthermore, though not shown, the region to hold a marker (operation identification value) is not necessarily limited to the BPR region 38, and the reserved regions 35 and 39 (for example, bit region of a part thereof) can be used. However, since it is difficult to predict the values of the reserved regions 35 and 39 in the already existing switching device, it is advantageous in this respect to use the sub-code region 32 and the BPR region 38 whose values can be predicted to some extent.

In the foregoing, the invention made by the inventor of the present invention has been concretely described based on the embodiments. However, the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system provided with a plurality of switching devices constituting a ring network,
wherein at least one of the plurality of switching devices includes:
a ring port connected to the ring network;
a memory which holds a predetermined value set in advance and a priority setting value arbitrarily set by a user;
at least one processor which transmits a first fault recovery notification frame from the ring port and receives a second fault recovery notification frame from a different switching device at the ring port when a recovery from fault of the ring port in a block state is detected; and
the at least one processor controls the ring network,
wherein the at least one processor executes stored instructions to:
set the priority setting value as a value of a predetermined region of the first fault recovery notification frame when transmitting the first fault recovery notification frame,
compare priority based on the value of the predetermined region of the first fault recovery notification frame and a value of the predetermined region of the second fault recovery notification frame and determines whether the ring port is maintained in the block state or changed from the block state to an open state based on a result of the comparison,
control the ring network based on a ring protocol specified by International Telecommunication Union Telecommunication Standardization Sector (ITU-T) G.8032, the first fault recovery notification frame and the second fault recovery notification frame are Ring-Automatic Protection Switching (No Request) (R-APS (NR)) frames, and
set the predetermined value set in advance as the value of the predetermined region when transmitting R-APS frames other than the R-APS (NR) frame.

2. The relay system according to claim 1,
wherein the predetermined region is a node ID region of the R-APS (NR) frame.

3. The relay system according to claim 2,
wherein, when a fault of the ring port is detected, the at least one processor is configured to transmit a Ring-Automatic Protection Switching (Signal Fail) (R-APS (SF)) frame from the ring port, and the at least one processor is configured to set a Media Access Control (MAC) address of its own device as a value of the node ID region of the R-APS (SF) frame when transmitting the R-APS (SF) frame, and
when a fault of the ring port is detected, the at least one processor is configured to control the ring port to the block state.

4. The relay system according to claim 1,
wherein the predetermined region is a first region different from a node ID region of the R-APS (NR) frame.

5. The relay system according to claim 4,
wherein, when the value of the first region of the second fault recovery notification frame is not the predetermined value set in advance, the at least one processor is configured to perform priority comparison based on the first region, and when the value of the first region of the second fault recovery notification frame is the predetermined value, the at least one processor is configured to compare priority based on a value of the node ID region of the first fault recovery notification frame and a value of the node ID region of the second fault recovery notification frame, and the at least one processor is configured to determine whether the ring port is maintained in the block state or changed from the block state to the open state based on a result of the comparison.

6. The relay system according to claim 4,
wherein the first region is a sub-code region.

7. The relay system according to claim 4,
wherein, when transmitting the first fault recovery notification frame, the at least one processor is configured to set an operation identification value set in advance as a value of a second region of the first fault recovery notification frame, the second region being different from the node ID region and the first region, and
when a value of the second region of the second fault recovery notification frame is the operation identification value, the at least one processor is configured to perform priority comparison based on the first region, and when the value of the second region of the second fault recovery notification frame is not the operation identification value, the at least one processor is configured to compare priority based on a value of the node ID region of the first fault recovery notification frame and a value of the node ID region of the second fault recovery notification frame, and the at least one processor is configured to determine whether the ring port is maintained in the block state or changed from the block state to the open state based on a result of the comparison.

8. The relay system according to claim 7,
wherein the first region is a sub-code region, and
the second region is a BPR (Blocked Port Reference) region.

9. The relay system according to claim 4,
wherein the first region is a reserved region.

10. A switching device constituting a ring network, comprising:
a ring port connected to the ring network;
a memory which holds a predetermined value set in advance and a priority setting value arbitrarily set by a user;
at least one processor which transmits a first fault recovery notification frame from the ring port and receives a second fault recovery notification frame from a different switching device at the ring port when a recovery from fault of the ring port in a block state is detected; and
the at least one processor controls the ring network,
wherein the at least one processor executes stored instructions to:
set the priority setting value as a value of a predetermined region of the first fault recovery notification frame when transmitting the first fault recovery notification frame,
compare priority based on the value of the predetermined region of the first fault recovery notification frame and a value of the predetermined region of the second fault recovery notification frame and determines whether the ring port is maintained in the block state or changed from the block state to an open state based on a result of the comparison,
control the ring network based on a ring protocol specified by International Telecommunication Union Telecommunication Standardization Sector (ITU-T) G.8032, the first fault recovery notification frame and the second fault recovery notification frame are Ring-Automatic Protection Switching (No Request) (R-APS (NR)) frames, and
set the predetermined value set in advance as the value of the predetermined region when transmitting R-APS frames other than the R-APS (NR) frame.

11. The switching device according to claim 10,
wherein the predetermined region is a node ID region of the R-APS (NR) frame.

12. The switching device according to claim 11,
wherein, when a fault of the ring port is detected, the at least one processor is configured to transmit a Ring-Automatic Protection Switching (Signal Fail) (R-APS (SF)) frame from the ring port, and the at least one processor is configured to set a Media Access Control (MAC) address of its own device as a value of the node ID region of the R-APS (SF) frame when transmitting the R-APS (SF) frame, and
when a fault of the ring port is detected, the at least one processor is configured to control the ring port to the block state.

13. The switching device according to claim 10,
wherein the predetermined region is a first region different from a node ID region of the R-APS (NR) frame.

14. The switching device according to claim 13,
wherein, when the value of the first region of the second fault recovery notification frame is not the predetermined value set in advance, the at least one processor is configured to perform priority comparison based on the first region, and when the value of the first region of the second fault recovery notification frame is the predetermined value, the at least one processor is configured to compare priority based on a value of the node ID region of the first fault recovery notification frame and a value of the node ID region of the second fault recovery notification frame, and the at least one processor is configured to determine whether the ring port is maintained in the block state or changed from the block state to the open state based on a result of the comparison.

15. The switching device according to claim 13,
wherein the first region is a sub-code region.

16. The switching device according to claim 13,
wherein, when transmitting the first fault recovery notification frame, the at least one processor is configured to set an operation identification value set in advance as a value of a second region of the first fault recovery notification frame, the second region being different from the node ID region and the first region, and
when a value of the second region of the second fault recovery notification frame is the operation identification value, the at least one processor is configured to perform priority comparison based on the first region, and when the value of the second region of the second fault recovery notification frame is not the operation identification value, the at least one processor is configured to compare priority based on a value of the node ID region of the first fault recovery notification frame and a value of the node ID region of the second fault recovery notification frame, and the at least one processor is configured to determine whether the ring port is maintained in the block state or changed from the block state to the open state based on a result of the comparison.

17. The switching device according to claim 16,
wherein the first region is a sub-code region, and
the second region is a BPR (Blocked Port Reference) region.

18. The switching device according to claim 13,
wherein the first region is a reserved region.

* * * * *